(12) United States Patent
Caridis et al.

(10) Patent No.: US 8,651,016 B2
(45) Date of Patent: Feb. 18, 2014

(54) UNITIZED VACUUM FRYER

(75) Inventors: Andrew A. Caridis, San Carlos, CA (US); James A. Padilla, Pacifica, CA (US); Anthony A. Caridis, Redwood City, CA (US); Thomas John Miller, Burlingame, CA (US); Donald Giles, Hayward, CA (US)

(73) Assignee: Heat and Control, Inc., Hayward, CA (US)

( * ) Notice: Subject to any disclaimer, the term of this patent is extended or adjusted under 35 U.S.C. 154(b) by 331 days.

(21) Appl. No.: 13/068,108

(22) Filed: May 2, 2011

(65) Prior Publication Data

US 2012/0279399 A1    Nov. 8, 2012

(51) Int. Cl.
*A47J 37/12*    (2006.01)
(52) U.S. Cl.
USPC .................................. 99/403; 99/404; 99/407

(58) Field of Classification Search
USPC ................. 99/403, 404, 407, 443 C; 426/438
See application file for complete search history.

(56) References Cited

U.S. PATENT DOCUMENTS

| | | | | |
|---|---|---|---|---|
| 3,812,775 | A * | 5/1974 | Sijbring | 99/404 |
| 4,852,475 | A * | 8/1989 | Yang | 99/404 |
| 5,767,487 | A * | 6/1998 | Tippmann | 219/440 |
| 5,988,051 | A * | 11/1999 | Hashiguchi et al. | 99/472 |
| 6,929,812 | B2 * | 8/2005 | Van Der Doe | 426/438 |

* cited by examiner

*Primary Examiner* — Henry Yuen
*Assistant Examiner* — John Wasaff
(74) *Attorney, Agent, or Firm* — Donald N. MacIntosh

(57) ABSTRACT

The unitized vacuum fryer is capable of low atmosphere vacuum cooking and has an elongate cooking tunnel having an upper portion separable from a base portion for cleaning and maintenance. When hermetically sealed together the two portions function to retain a high vacuum for an enclosed fry cooking system. Hermetic sealing locks at each end of the tunnel afford product entry and exit. The vacuum fryer does not require a separate enclosing pressure vessel.

7 Claims, 4 Drawing Sheets

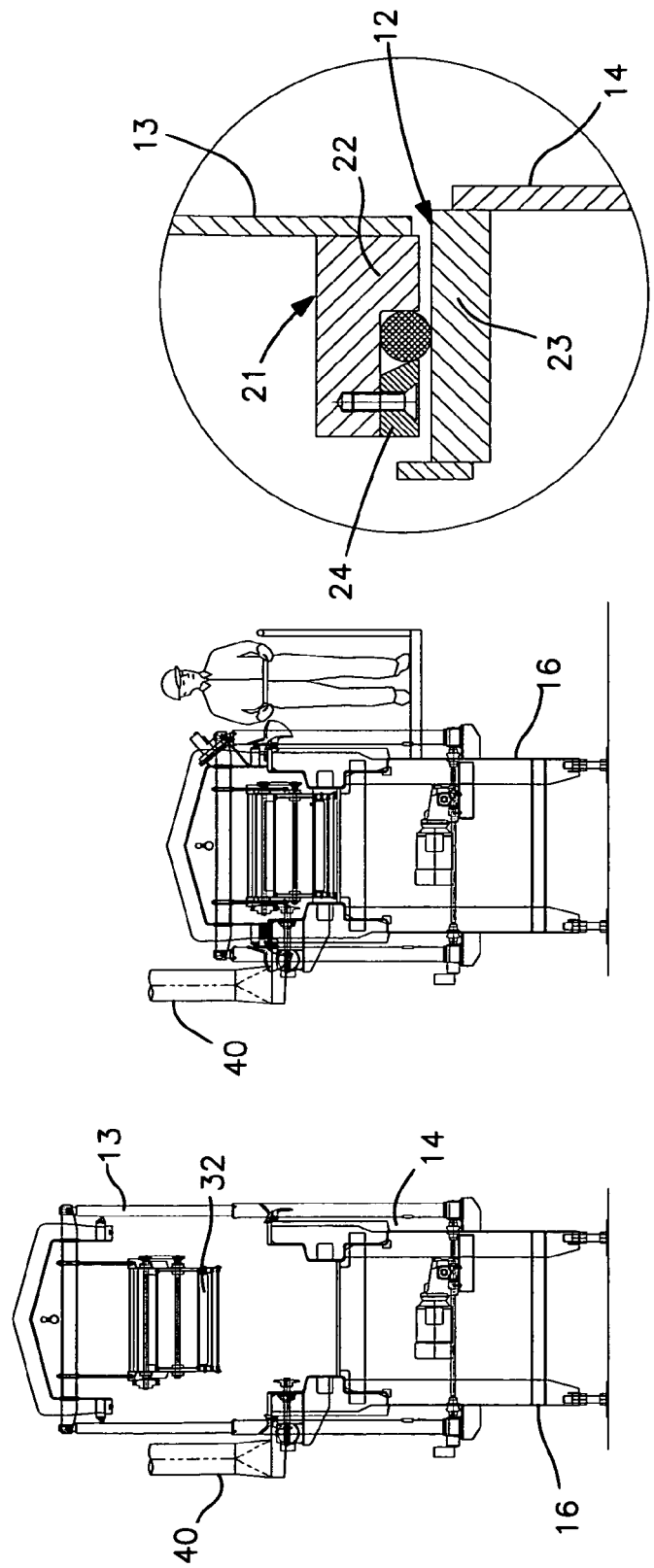

UNITIZED VACUUM FRYER

FIELD OF THE INVENTION

This invention concerns frying food products in a pressure reduced atmosphere and particularly relates to an improved unitized fryer apparatus which is its own pressure vessel without the need of an independent pressure vessel surrounding a removable fryer system.

BACKGROUND OF THE INVENTION

The advantages of frying food products in a reduced pressure atmosphere or vacuum are well understood. Where the cooking environment is in a range of about a minus 14.0 psi absolute or 28.5 mm Hg vacuum, foods can be cooked at lower temperatures. In the case where cooking oil or fats are the cooking medium effective temperatures may be on the order of 120° C. to about 140° C. In this temperature range the development of acrylamides in food products is significantly reduced, as is oil uptake by the product and the product quality is enhanced. The Maillard reaction, a form of nonenzymatic browning similar to carmelization, is also better controlled within the lower pressure, lower temperature parameters. As is known, the Maillard reaction results from a chemical reaction between an amino acid and a reducing sugar usually in the presence of heat. At high temperatures, acrylamide can be formed which is undesirable.

Workers in this field have recognized these benefits and have developed equipment to vacuum fry a variety of products including potato chips/crisps and the like. The prior art vacuum cooking equipment generally followed either one of two design configurations. First, a batch cooker was used in a cycle where product to be cooked was placed in a chamber sufficiently strong to sustain a vacuum, the chamber was then evacuated, cooking heat applied for the desired period after which the chamber was reopened after breaking the vacuum. Product was then removed and the cycle repeated as is common in batch cooking procedures. Although the resulting cooked food product was satisfactory, production output was low and equipment costs high in view of the low production volume. The chamber cleaning and maintenance was cumbersome and time consuming. This configuration is typified by the Tippmanm U.S. Pat. No. 5,767,487 granted Jun. 16, 1998.

Second, a removable fryer apparatus operatively arranged within a pressure vessel was a design configuration adapted to achieve continuous production vacuum frying. This is typified by the Hashiguchi, at al U.S. Pat. No. 5,988,051 granted Nov. 23, 1999; the Van Der Doe U.S. Pat. No. 6,929,812 granted Aug. 16, 2005; and the Yang U.S. Pat. No. 4,852.475 granted Aug. 1, 1989. The removable fryer-in-a-pressure-vessel configuration was costly to manufacture and occupied a large floor space in the plant given its production capacity. This was due to the need for a maintenance zone and an external fryer support structure outside of the pressure vessel into which the fryer could be shifted for servicing. Additionally, the pressure vessel, inside of which the fryer operated, required a large sealable hatch at one end so that the fryer could be moved in and out for cleaning and maintenance. The manufacturing costs and sizable plant operating space were recognized disadvantages for the fryer-in-a-pressure-vessel configuration.

SUMMARY OF THE INVENTION AND OBJECTS

The invention in summary resides in a vacuum fryer tunnel of monocoque construction constructed to withstand repeated cycles of internal full vacuum to normal atmosphere pressures and containing within a hermetically sealed two part shell (hood and base) an operative hot oil fryer. Hoists are provided for lifting the shell hood from the base permitting access to the fryer for servicing and maintenance purposes and product inlet and outlet hermetic locks are provided at each end of the tunnel through which food products are received for frying and discharged when cooked. Vacuum system apparatus coupled to the tunnel selectively removes the vapor atmosphere within the tunnel down to a substantially full vacuum, minus 14.7 psi or 28 mm Hg. Thus the hot oil fryer is itself its own pressure vessel without need of any separate external pressure vessel as in the prior art.

A general object of the invention is to provide a unitized vacuum fryer that operates fully without an external pressure enclosure and that may be opened easily without any external support structures for service and maintenance and thereafter closed, returning to the operative hermetically sealed condition.

Another object of the invention is to provide a unitized vacuum fryer that is relatively economical to manufacture and that occupies a modest foot print within the processing plant as when compared to the fryer-in-a-pressure-vessel design.

A further object of the invention is to provide means for reliably sealing the two tunnel shell portions to hold the internal vacuum that will not degrade in a long service life and withstand repeated vacuum cycles.

Still another object of the invention is to provide a vacuum fryer that enables frying food products in a very low or zero pressure atmosphere so as to achieve the benefits in product appearance, oil content and low acrylamide content and yet be economical to manufacture, maintain and operate over a long service life.

These and other objects of the invention will become apparent from the following description of a preferred embodiment taken in connection with the accompanying drawings.

BRIEF DESCRIPTION OF THE DRAWINGS

FIGS. 4a & b are lateral sectional views of the fryer assemble showing in FIG. 4a the fryer hood in an elevated position for cleaning and maintenance and in FIG. 4b the hood in a lowered position; and FIG. 4c is a greatly enlarged sectional view of a seal structure enabling a hermetic union of the fryer hood to the fryer base portion.

DESCRIPTION OF A PREFERRED EMBODIMENT

Figure 1:
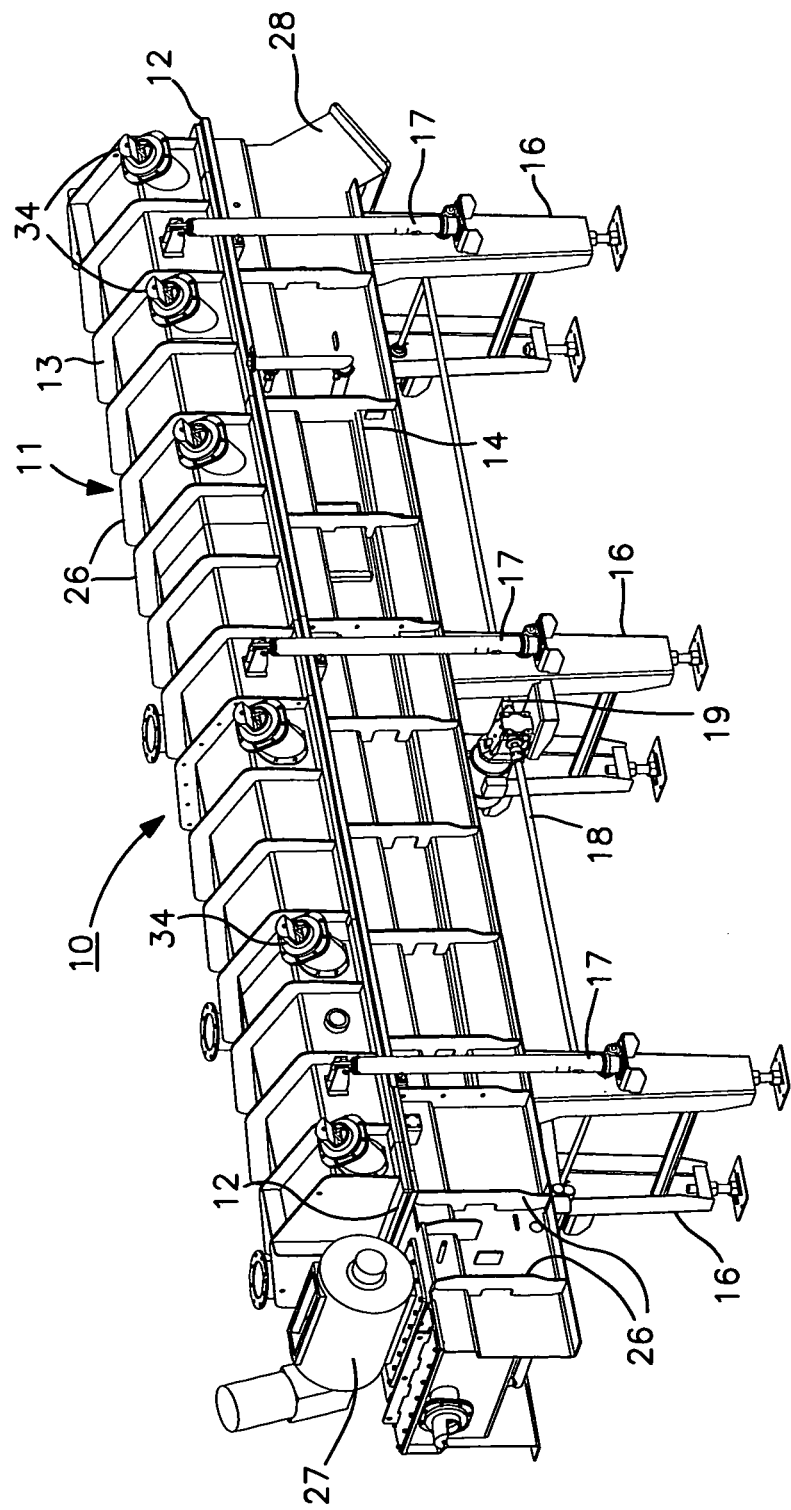
FIG. 1 is perspective view of one embodiment of a unitized vacuum fryer made in accordance with and embodying the features and characteristics of the present invention.
Figure 2:
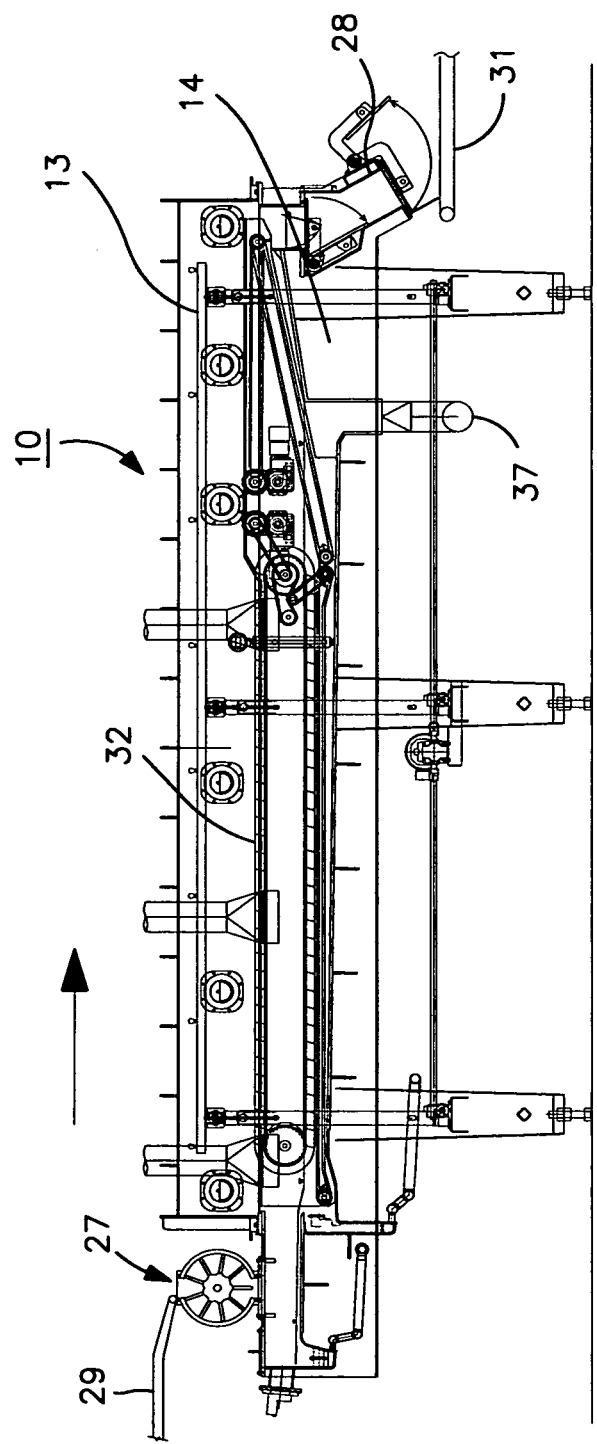
FIG. 2 is longitudinal, vertical sectional view of the unitized vacuum fryer shown in FIG. 1.

A unitized vacuum fryer 10 made in accordance with and embodying the principles of the present invention is shown in the drawings and as illustrated in FIGS. 1, 2 and 4 comprises a hermetically sealable, elongated cooking tunnel 11. The tunnel is separable along a horizontal plane 12 into an upper hood assembly 13 and a base or pan assembly 14. The vacuum fryer 10 is equipped with pairs of supporting legs 16, three pairs being illustrated in the drawings.

As clearly shown in FIG. 1, a jacking or hoist mechanism 17 is mounted on each of the legs 16 and is coupled to the hood 13. Each of mechanisms 17 is connected in a drive train 18 driven by an electric motor and transmission 19 whereby through selective actuation of the motor the jacking mechanisms 17 will serve to raise or lower the hood assembly 13 with respect to the base or pan assembly 14, as indicated in FIGS. 4a and b. Alternatively, a cable and pulley hoist system may serve the same purpose.

Referring specifically to FIG. 4c, vacuum sealing provisions 21 for the cooking tunnel 11 are arranged along the horizontal margins of the hood 13 and pan 14. Rigidly secured to each the sidewalls of the hood 13 and pan 14 are laterally outwardly extending flange members 22 and 23 respectively which provide confronting surfaces. An elastomeric seal material 24 is arranged between the confronting surfaces to withstand repeated compression and release cycles as vacuum pressure is applied and released in the tunnel 11. The seal material 24 may be selected from known O-ring formulations and, as shown, has a circular cross-section and is partially seated in a recess within the flange 22. As seen in FIG. 4c, a portion of the seal 24 protrudes from the recess to engage the flange 23 when the hood 13 and pan 14 are in the closed condition. Thus, as the flanges 22 and 23 are drawn together in response to a vacuum condition within the tunnel 11, (or in response to squeezing action of mechanical clamps acting against the flanges 22, 23, not shown) the elastomeric seal will deform serving to create an air-tight condition between the hood and pan thus insuring the maintenance of a vacuum for cooking within the tunnel 11. When the vacuum is released and the flanges separated as for lifting the hood, the seal 24 will return generally to its initial condition and will do this over a long service life. Other types of seal materials and geometries could be used to achieve the desired air-tight condition as will be apparent to those skilled in the art.

The elongate cooking tunnel 11, both hood 13 and pan 14, are constructed to withstand low internal pressures, to as low as minus 14.7 psi. without substantial deflection, deformation or deterioration over a long service life. To this end metal panels of substantial thickness and which are generally flat for ease of manufacture are employed in monocoque construction. As clearly shown in FIG. 1, a plurality of laterally extending longitudinally spaced apart stiffening ribs is rigidly secured to both the hood 13 and pan 14 so as to constrain any deflection of the metal panels during the unitized fryer's operation under vacuum conditions.

To maintain the low pressure integrity of the vacuum chamber within the tunnel 11 during continuous product cooking operations, hermetically sealing locks are mounted at the product inlet end and the product discharge end so that food products may be received into the vacuum chamber, cooked and discharged therefrom. More specifically, as shown in FIGS. 1 and 2 a product inlet lock 27 is shown operatively mounted at the left end of the tunnel 11 and a product discharge lock 28 is shown operatively mounted at the right end of the tunnel 11. Although there is a variety of hermetically sealing lock designs, we prefer to employ a multi-vane rotating lock 27 at the feed end and a double flapper door lock 28 at the product discharge end. These designs perform their intended functions very well but we shall not be limited to these designs configurations exclusively. Serving to deliver food products such as raw potato slices to the inlet lock 27 is an inlet product conveyor 29, shown in FIGS. 2 and 3. A product take away conveyor 31 is positioned adjacent the product discharge lock 28 to receive cooked products such as potato chips/crisps from the lock for conveyance to a further processing station.

Figure 3:
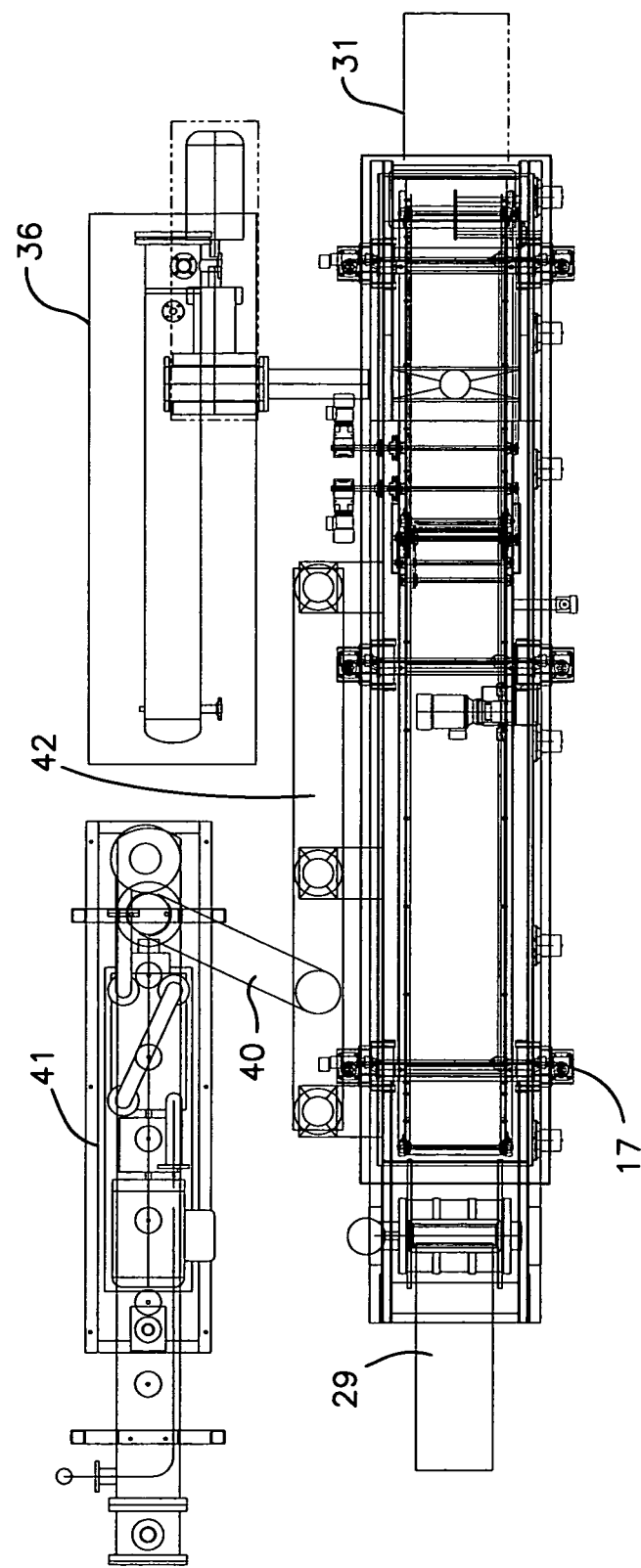
FIG. 3 is a plan view of the fryer assembly shown in FIG. 2.

It will be understood that the apparatus 10 functions as a vacuum fryer operating continuously to cook products. To this end the base or pan 14 is equipped to contain a bath of cooking oil and operative product conveyor means 32 function in a manner well known in the field. That is to say, heating and temperature controls are provided to maintain the cooking oil at the desired temperatures and speed controls on the conveyor means are provided to urge the food products through the oil bath while cooking. An oil heating and pump assembly 36 is indicated in FIG. 3 whereby cooking oil may be withdrawn from the pan 14 through the conduit 37 (FIG. 2), filtered, reheated and recirculated back into the pan. As shown in FIG. 1, a plurality of visual inspection ports 34 is arranged in the hood 13 so that the plant operators can observe the cooking operations at several positions along the cooking tunnel 11.

Vacuum system apparatus 41 is provided and connected via a duct 40 to a manifold 42 mounted on the tunnel 11, FIG. 3. The vacuum system is selected and designed to extract from the tunnel 11 volumes of air, oil mist, and moisture generated from product cooking. Further, the vacuum system 41 may operate continuously during the cooking operation so as to maintain a high vacuum on the order of minus 14 psi to down to about minus 14.7 psi. within the cooking chamber.

It will be readily apparent that various modifications may be made to the unitized vacuum fryer of this invention and still be within the scope of the present invention. In particular, in may be readily appreciated by those skilled in this art from the above description that the apparatus according to the invention provides for adjustability and modifications of the vacuum system, oil treatment system and the hermetic product inlet and outlet locks as well as other components. Accordingly, the scope of this invention shall only be limited within terms and spirit of the following claims.

What is claimed is:

1. A unitized vacuum fryer constructed and arranged for low atmosphere vacuum cooking of food products, comprising:
   a hermetically sealed, elongated cooking tunnel separable along a horizontal plane into an upper hood portion and a lower base portion,
   hoisting means for lifting said hood portion from said base portion serving to permit ready internal access to said tunnel for maintenance and cleaning,
   vacuum sealing means arranged at the joining surfaces of said base and hood portions and being operable to seal and unseal in response to the creation and release of vacuum conditions within said tunnel,
   food product fryer means arranged within said tunnel and continuously operable to cook products under vacuum conditions at selected cooking oil temperatures, vacuum chamber pressures and cook times,
   said tunnel having a product input end and a product discharge end,
   hermetic locks arranged at each said input and discharge ends serving to afford product input and discharge with minimal air ingress,
   vacuum system means in communication with the tunnel serving continuously to remove the vapors generated by the food products under cooking conditions, and to evacuate vapor from said tunnel to a negative pressure on the order of minus 14.0 psi.

2. The unitized vacuum fryer of claim 1 wherein said vacuum sealing means includes complementary, confronting planar surfaces arranged respectively on the perimeters of said base and hood portions, and resiliently compressible means extending along said planar surfaces serving to effect a hermetic seal between said hood and base portions permitting a vacuum condition to persist within said cooking tunnel.

3. The apparatus of claim 2 wherein said vacuum sealing means is constructed and arranged to accommodate deformations and deflections from raising and lowering the hood portion with respect to the base portion so that a vacuum may be achieved reliably over a multiplicity of vacuum drawdown and vacuum release cycles, said planar surfaces being provided with an elongate cavity, said resilient compressible means being disposed partially in said cavity and being formed from an elastomeric material.

4. The unitized vacuum fryer of claim 1 wherein said elongated cooking tunnel is of steel, monocoque construction configured to resist without disabling deformations exterior pressures on the order of 14.0 psi.

5. The apparatus of claim 4 wherein a plurality of longitudinally spaced apart stiffening ribs are rigidly secured to and disposed exteriorly along said cooking tunnel complementing the monocoque construction.

6. The unitized vacuum fryer of claim 4 wherein said elongated cooking tunnel includes wall portions formed of flat plate.

7. The unitized vacuum fryer of claim 1 wherein said base portion of said tunnel serves to accommodate a cooking oil bath, food product conveyor apparatus fixedly mounted in said base portion and serving to move through said oil bath food products to be cooked, and discharge conveyor apparatus fixedly mounted in said base portion serving to carry the food products to the discharge end for exit through said hermetic lock whereby food products are discharged from the vacuum fryer.

* * * * *